United States Patent
Rushing et al.

(10) Patent No.: US 7,400,961 B2
(45) Date of Patent: Jul. 15, 2008

(54) POWERTRAIN AND METHOD FOR CONTROLLING A DRIVELINE RETARDER

(75) Inventors: Mark A. Rushing, Martinsville, IN (US); Jeffrey E Shultz, Zionsville, IN (US); Bradley L. Mc Cafferty, Zionsville, IN (US); Randall S. Conn, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 42 days.

(21) Appl. No.: 11/427,990

(22) Filed: Jun. 30, 2006

(65) Prior Publication Data

US 2008/0004784 A1 Jan. 3, 2008

(51) Int. Cl.
*G06F 7/70* (2006.01)
(52) U.S. Cl. .......................................... 701/70; 701/93
(58) Field of Classification Search ................... 701/70, 701/93; 180/179; 73/3
See application file for complete search history.

(56) References Cited

U.S. PATENT DOCUMENTS

| | | | |
|---|---|---|---|
| 4,235,320 A | 11/1980 | Polak et al. | 192/4 B |
| 4,711,328 A | 12/1987 | Bazilio et al. | 188/296 |
| 4,768,401 A | 9/1988 | Fuehrer et al. | 74/846 |
| 4,836,341 A | 6/1989 | Hall, III | 188/290 |
| 5,634,446 A * | 6/1997 | Rauznitz et al. | 123/322 |
| 5,855,534 A * | 1/1999 | Bates | 477/120 |
| 6,076,622 A * | 6/2000 | Chakraborty et al. | 180/169 |
| 6,202,780 B1 * | 3/2001 | Tanaka et al. | 180/179 |
| 6,223,592 B1 * | 5/2001 | Genise | 73/118.1 |
| 6,280,728 B1 * | 8/2001 | Stauder et al. | 424/94.64 |
| RE38,615 E * | 10/2004 | Dresden et al. | 74/336 R |
| 2002/0079173 A1 * | 6/2002 | Suo et al. | 188/158 |

FOREIGN PATENT DOCUMENTS

WO    WO 94/10002    *    5/1994

* cited by examiner

*Primary Examiner*—Mark Hellner

(57) ABSTRACT

A method of controlling a driveline retarder of a powertrain including a transmission having a rotatable input shaft connected to an engine and an output shaft connected to the driveline retarder is provided. The method includes determining a set speed value and comparing the set speed value plus a customer modifiable constant value to a current rotational speed value of the output shaft. A driveline retarder cruise modulation torque request value is then calculated when the current rotational speed value of the output shaft is greater than or equal to the set speed value plus the customer modifiable constant value. The driveline retarder is controlled as a function of the driveline retarder cruise modulation torque request value. A powertrain configured to implement the aforementioned method is also disclosed.

21 Claims, 2 Drawing Sheets

POWERTRAIN AND METHOD FOR CONTROLLING A DRIVELINE RETARDER

TECHNICAL FIELD

The present invention relates to a powertrain and method of controlling the operation of a driveline retarder for a vehicle.

BACKGROUND OF THE INVENTION

The use of driveline retarders as a means for applying braking torque to a vehicle transmission is well known. Typically, such driveline retarders employ a rotary member connected to the hub of a transmission output shaft that is operative to circulate fluid between vane members on a stationary housing. The fluid circulation results in power absorption and retardation of the rotational speed of the transmission output shaft. A reduction in vehicle speed typically results from such action, assuming that the roadway or other supportive surface of the vehicle demonstrates a frictional coefficient of sufficient magnitude to support such braking torque. The driveline retarder is especially suited to slow or control the speed of a vehicle so equipped when traversing steep grades.

It is generally known to employ a solenoid valve in hydrodynamic-type driveline retarders to function as a pressure control valve under electro-hydraulic solenoid modulation as controlled by an appropriate electronic control unit such as a dedicated microprocessor or the like. The duty cycle at which the solenoid valve is actuated or modulated regulates the driveline retarder capacity or the load applied to the output shaft of the transmission and, accordingly, controls the braking activity of the driveline retarder. The mechanical structure and control architecture of the previously known driveline retarders are generally adaptable for implementation in accordance with the present invention.

SUMMARY OF THE INVENTION

A method of controlling a driveline retarder of a vehicular powertrain is provided. The powertrain includes a transmission having a rotatable input shaft operatively connected to an engine and an output shaft operatively connected to the driveline retarder. The method includes comparing a set speed value plus a customer modifiable constant value to a current rotational speed value of the output shaft. Additionally, the method includes calculating a driveline retarder cruise modulation torque request value as a function of at least one of set speed value, current rotational speed value of the output shaft, acceleration rate of the output shaft, and time, when the set speed value plus the customer modifiable constant value is greater than or equal to the current rotational speed value of the output shaft. The driveline retarder is then controlled as a function of the driveline retarder cruise modulation torque request value.

The method also includes determining the set speed value if cruise control is active and driveline retarder cruise is enabled. The set speed value may be set equal to the current rotational speed value of the output shaft if engine load is greater than or equal to a predetermined calibration constant. The driveline retarder cruise modulation torque request value may be set equal to zero if engine load is less than a predetermined calibration value. Additionally, the driveline retarder cruise modulation torque request value may be set equal to zero if the current rotational speed value of the output shaft is greater than or equal to the set speed value plus the customer modifiable constant value.

A vehicular powertrain is also provided. The powertrain includes a transmission having a rotatable input shaft and a rotatable output shaft. An engine is operatively connected to the input shaft, while a driveline retarder is operatively connected to the output shaft. A first electronic control unit is provided in communication with the engine and operable in a cruise control mode. A second electronic control unit is provided in communication with at least one of the transmission and the driveline retarder. A data link communicates with the first and second electronic control units and operates to provide communication between the first and second electronic control units. The second electronic control unit is preferably configured to compare a set speed value plus a customer modifiable constant value to a current rotational speed value of an output shaft. Subsequently, the second electronic control unit calculates a driveline retarder cruise modulation torque request value as a function of at least one of the set speed value, the current rotational speed value of the output shaft, acceleration rate of the output shaft, and time when the current rotational speed of the output shaft is greater than or equal to the set speed value plus the customer modifiable constant value. Finally, the second electronic control unit operates to control the driveline retarder as a function of the driveline retarder cruise modulation torque request value.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
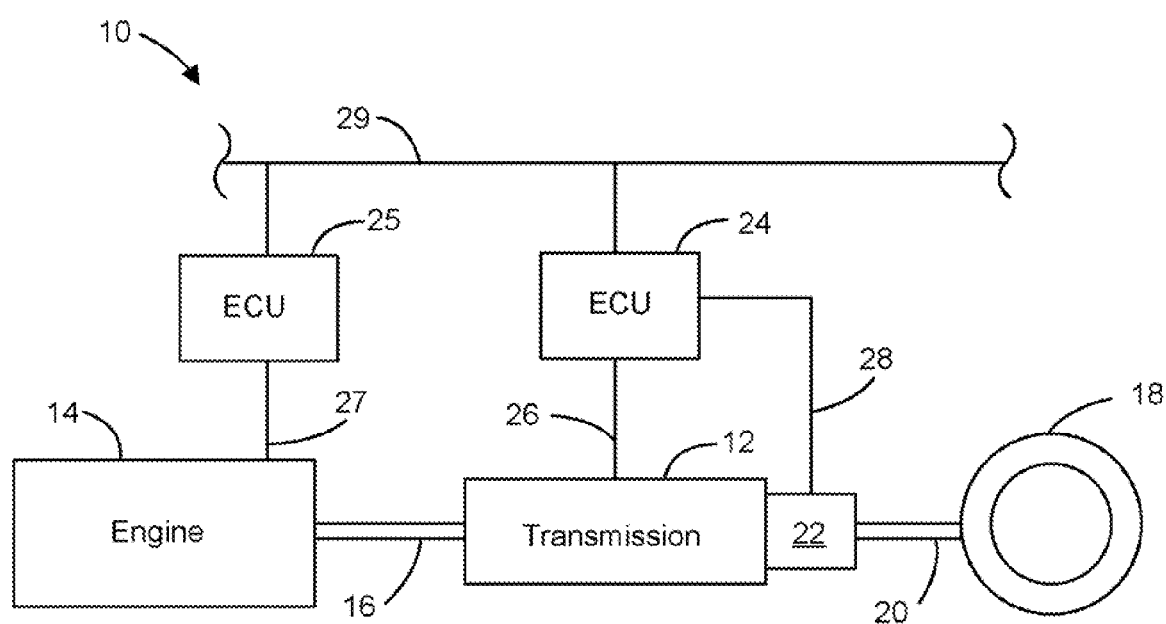
FIG. 1 is a schematic diagrammatic representation of a vehicular powertrain incorporating a driveline retarder controlled by an electronic control unit in accordance with a method of the present invention.

Referring now to the figures and more particularly FIG. 1, there is shown a vehicular powertrain, a portion of which is generally indicated at 10. The vehicular powertrain 10 includes a transmission 12 interconnected to an engine 14 through a transmission input shaft 16. The powertrain 10 further includes a final drive 18, such as a differential, interconnected to the transmission 12 though a transmission output shaft 20. The transmission 12 includes a plurality of gear sets, not shown, operable to accommodate or provide various power transmission ratios between the transmission input shaft 16 and the transmission output shaft 20.

A driveline retarder 22 is interconnected with the transmission output shaft 20 and is operable to selectively and variably provide a braking or resistive force to the rotation of the transmission output shaft 20. The driveline retarder 22 may be of any type generally known in the art, such as a hydrodynamic device. An electronic control unit, or ECU 24, is interconnected with the transmission 12 and driveline retarder 22 by respective buses 26 and 28. An ECU 25 in interconnected with the engine 14 and a data link 29. Additionally, the ECU 24 may receive signals from the engine 14 and vehicle sensors over the data link 29. The data link 29 may be of the type SAE J1939, SAE J1587, IES-CAN, or other similar data link. The ECUs 24 and 25 are preferably a programmable microprocessor device, which is known to those skilled in the art. It should be appreciated that the ECU 24 receives, for example, data indicating the active state of the cruise control system, active state of the driveline retarder 22, the speed of the vehicle, the rotational speed of the transmission output shaft 20, the cruise control set speed (if available and if cruise control is enabled), throttle position, etc. The ECU 24 is operable to control the shifting of the transmission 12 through the bus 26 and controls the duty cycle or modulation torque of the driveline retarder 22 over the bus 28. It should also be appreciated that the ECU 25 receives, for example, data indicating the active state of the cruise control system, throttle position, etc. and is operable to control the operation of the engine 14 over a bus 27. Additionally, the ECU 25 includes the required software to operate the powertrain 10 in a cruise control mode. That is by providing a vehicle set speed, usually determined, by the vehicle operator, the speed of the vehicle can be maintained at or near that vehicle set speed. This cruise control mode may also include a selectively activatable coast mode, i.e. when the cruise control mode is active but disengaged. Since the transmission output shaft 20 is operatively connected to the final drive 18, the vehicle set speed is proportional to the rotational speed of the transmission output shaft 20.

Figure 2:
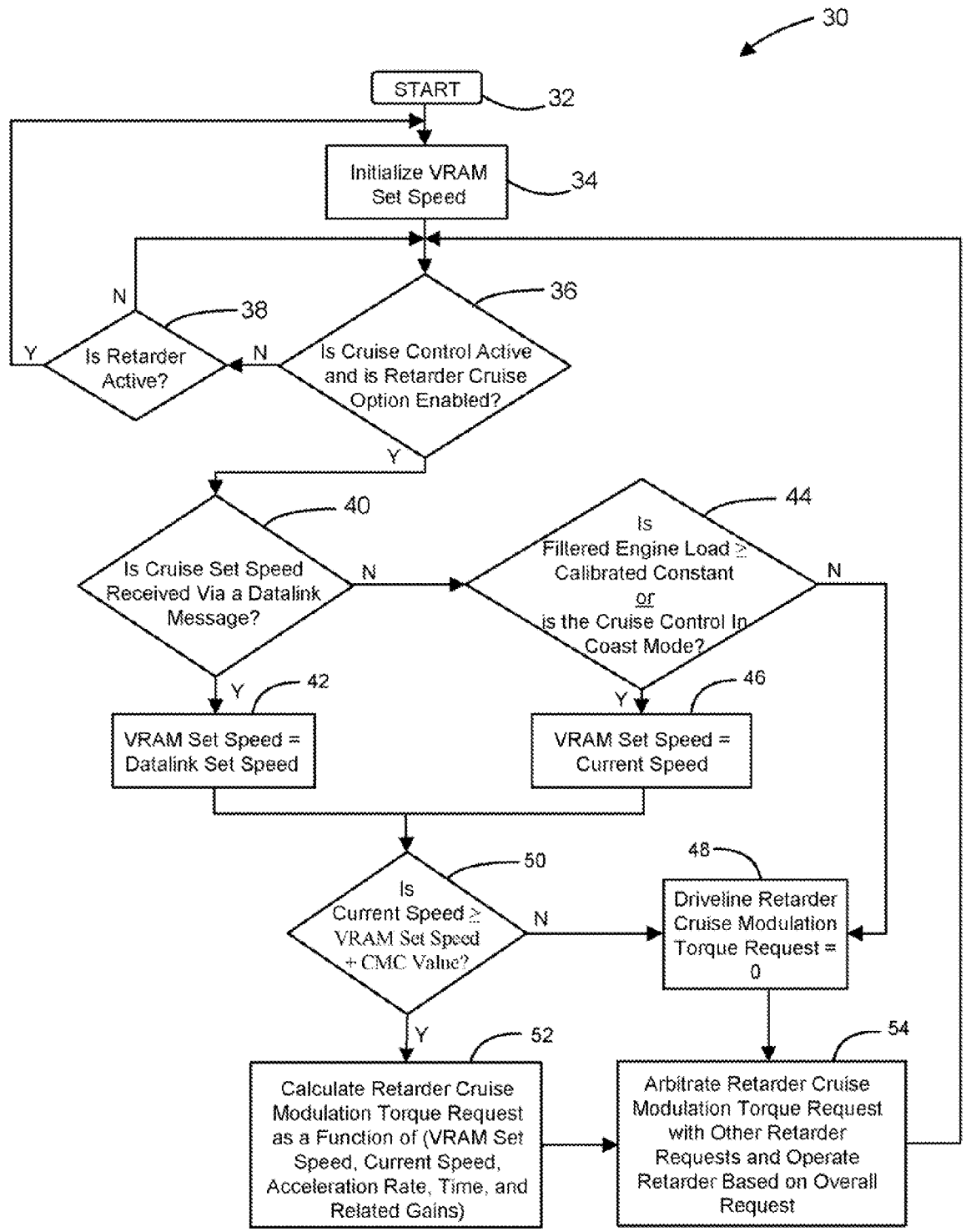
FIG. 2 is a method, presented in flowchart form, of controlling the driveline retarder of FIG. 1 in accordance with the present invention.

Referring now to FIG. 2 and with continued reference to FIG. 1, a method 30 for controlling the driveline retarder 22 in conjunction with the cruise control system is shown in accordance with the present invention. More precisely, FIG. 2 illustrates a block diagram or flowchart representing steps performed by a control device such as the ECU 24. The method 30 begins at step 32 and proceeds to step 34 where a volatile random access memory, or VRAM, set speed value is initialized to clear any stored values. The method 30 will then proceed to step 36 where a determination is made as to whether the cruise control system is active and whether the cruise control option for the driveline retarder 22 is enabled. If either the cruise control is inactive or the cruise control option for the driveline retarder 22 is disabled, the method proceeds to step 38 where a determination is made as to whether the driveline retarder 22 is active. If the driveline retarder 22 is not active, the method 30 will loop to step 36. Alternately, if the driveline retarder 22 is active, the method 30 will loop to step 34. Returning to step 36, if both the cruise control is active and the cruise control option for the driveline retarder 22 is enabled, the method 30 proceeds to step 40.

At step 40, a determination is made as to whether a cruise control set speed value is received via the data link 29. If the cruise control set speed is available over the data link 30, then this value is stored as the VRAM set speed as illustrated at step 42. Alternately, if the cruise control set speed is not received or available over the data link 29, the method proceeds to step 44. At step 44, a determination is made as to whether the value for filtered or conditioned engine load, such as the percentage of engine fueling or throttle opening, is greater than or equal to a predetermined calibrated constant stored within the ECU 24. The value of the predetermined calibrated constant is preferably non-modifiable and constitutes part of the preprogrammed calibration contained within the ECU 24. Additionally, a determination is made as to whether the cruise control coast mode is active. If the filtered engine load is greater than or equal to the calibrated constant and/or the cruise control coast mode is active, the method 30 proceeds to step 46 where the current rotational speed value of the transmission output shaft 20 of the transmission 12 is stored as the VRAM set speed. Alternately, if the filtered engine load is less than the calibrated constant and the cruise control coast mode is not active, the method 30 proceeds to step 48 where the driveline retarder cruise modulation torque value for the control of the driveline retarder 22 is set equal to zero.

From step 42 or step 46, the method 30 proceeds to step 50 where a determination is made whether the current rotational speed of the transmission output shaft 20 is greater than or equal to the VRAM set speed, stored at step 42 or 46, added to a customer modifiable constant, or CMC, value. The CMC value may be modified or adjusted via a service tool known to those skilled in the art and may also include a hysteresis or offset. If the current rotational speed of the transmission output shaft 20 is less than the VRAM set speed value plus the CMC value, the method 30 will proceed to step 48 where the driveline retarder cruise modulation torque value for the control of the driveline retarder 22 is set equal to zero. If the current rotational speed of the transmission output shaft 20 is greater than or equal to the VRAM set speed value plus the CMC value, the method 30 will proceed to step 52.

At step 52, a value for the driveline retarder cruise modulation torque request is calculated as a function of the VRAM set speed, current rotational speed of the output shaft 20, rate of acceleration of the output shaft 20, time, and other related gains. Once the calculation is made at step 52, the method 30 will proceed to step 54. Additionally, step 48 proceeds to step 54. At step 54, the calculated driveline retarder cruise control modulation torque request is arbitrated or compared with other driveline retarder requests, such as manual activation requests from the operator of the vehicle. The driveline retarder 22 is then operated or controlled based on the overall driveline retarder requests. Subsequently, the method 30 of the present invention will loop from step 54 to step 36.

Since the vehicle weight and road grade are often difficult to determine, a precise braking toque for the driveline retarder 22 may be difficult to calculate. The method 30 of the present invention provides a closed loop algorithm to determine the requested torque value for driveline retarder 22 based on current rotational speed of the output shaft 20 and the desired speed of the transmission output shaft 20 multiplied by a variable gain. Additionally, the method 30 of the present invention determines the requested torque value for driveline retarder 22 based on the acceleration of the transmission output shaft 20 versus the desired acceleration that will achieve the desired speed of the transmission output shaft 20.

While the best modes for carrying out the invention have been described in detail, those familiar with the art to which this invention relates will recognize various alternative designs and embodiments for practicing the invention within the scope of the appended claims.

The invention claimed is:

1. A method of controlling a driveline retarder of a vehicular powertrain including a transmission having a rotatable input shaft operatively connected to an engine and an output shaft operatively connected to the driveline retarder, the method comprising:

comparing a set speed value plus a customer modifiable constant value to a current rotational speed value of the output shaft;

calculating a driveline retarder cruise modulation torque request value as a function of at least one of said set speed value, said current rotational speed value of the output shaft, acceleration rate of the output shaft, and time, when said set speed value plus said customer modifiable constant value is greater than or equal to said current rotational speed value of the output shaft; and controlling the driveline retarder as a function of said driveline retarder cruise modulation torque request value.

2. The method of claim 1, further comprising determining said set speed value.

3. The method of claim 2, wherein determining said set speed value is enabled if cruise control is active and driveline retarder cruise option is enabled.

4. The method of claim 2, further comprising setting said set speed value equal to one of a set speed received from a data link and said current rotational speed value of the output shaft.

5. The method of claim 2, further comprising setting said set speed value equal to said current rotational speed value of the output shaft if engine load is greater than or equal to a predetermined calibration constant.

6. The method of claim 2, further comprising setting said set speed value equal to said current rotational speed value of the output shaft if cruise control coast mode is active.

7. The method of claim 1, further comprising setting said driveline retarder cruise modulation torque request value equal to zero if engine load is less than a predetermined calibration value.

8. The method of claim 1, further comprising setting said driveline retarder cruise modulation torque request value equal to zero if said current rotational speed value of the output shaft is less than said set speed value plus said customer modifiable constant value.

9. A vehicular powertrain comprising:
a transmission having a rotatable input shaft and a rotatable output shaft;
an engine operatively connected to said input shaft;
a driveline retarder operatively connected to said output shaft;
a first electronic control unit in communication with said engine and operable in a cruise control mode;
a second electronic control unit in communication with at least one of said transmission and said driveline retarder;
a data link in communication with said first and second electronic control units and operable to provide communication between said first and second electronic control units;
wherein said second electronic control unit is configured to:
compare a set speed value plus a customer modifiable constant value to a current rotational speed value of an output shaft;
calculate a driveline retarder cruise modulation torque request value as a function of at least one of said set speed value, said current rotational speed value of said output shaft, acceleration rate of said output shaft, and time, when said current rotational speed value of said output shaft is greater than or equal to said set speed value plus said customer modifiable constant value; and
control the driveline retarder as a function of said driveline retarder cruise modulation torque request value.

10. The vehicular powertrain of claim 9, wherein said second electronic control unit is configured to determine said set speed value if said cruise control mode is active and driveline retarder cruise option is enabled.

11. The vehicular powertrain of claim 9, wherein said second electronic control unit is configured to set said set speed value equal to one of a set speed received from said data link and said current rotational speed value of the output shaft.

12. The vehicular powertrain of claim 9, wherein said second electronic control unit is configured to set said set speed value equal to said current rotational speed value of said output shaft if the load on said engine is greater than or equal to a predetermined calibration constant.

13. The vehicular powertrain of claim 9, wherein said second electronic control unit is configured to set said set speed value equal to said current rotational speed value of said output shaft if the load on said engine is greater than or equal to a predetermined calibration value.

14. The vehicular powertrain of claim 9, wherein said second electronic control unit is configured to set said driveline retarder cruise modulation torque request value equal to zero if the load on said engine is less than a predetermined calibration value.

15. The vehicular powertrain of claim 9, wherein said second electronic control unit is configured to set said driveline retarder cruise modulation torque request value equal to zero if said current rotational speed value of said output shaft is less than said set speed value plus said customer modifiable constant value.

16. A method of controlling a driveline retarder of a vehicular powertrain including a transmission having a rotatable input shaft operatively connected to an engine and an output shaft operatively connected to the driveline retarder, the method comprising:
determining a set speed value;
comparing said set speed value plus a customer modifiable constant value to a current rotational speed value of the output shaft;
calculating a driveline retarder cruise modulation torque request value as a function of at least one of said set speed value, said current rotational speed value of the output shaft, acceleration rate of the output shaft, and time, when said set speed value plus said customer modifiable constant value is greater than or equal to said current rotational speed value of the output shaft;
setting said driveline retarder cruise modulation torque request value equal to zero if engine load is less than a predetermined calibration value;
setting said driveline retarder cruise modulation torque request value equal to zero if said current rotational speed value of the output shaft is less than said set speed value plus said customer modifiable constant value; and
controlling the driveline retarder as a function of said driveline retarder cruise modulation torque request value.

17. The method of claim 16, wherein determining said set speed value is enabled if cruise control is active and driveline retarder cruise option is enabled.

18. The method of claim 16, further comprising setting said set speed value equal to one of a set speed received from a data link and said current rotational speed value of the output shaft.

19. The method of claim 16, further comprising setting said set speed value equal to said current rotational speed value of the output shaft if engine load is greater than or equal to a predetermined calibration constant.

20. The method of claim 16, further comprising setting said driveline retarder cruise modulation torque request value equal to zero if the load on said engine is less than a predetermined calibration value.

21. The method of claim 1, wherein said customer modifiable constant value is modifiable via a service tool.

* * * * *